Jan. 6, 1925.
CHRIS TER COCK
SHAFT OR ROD COUPLING
Filed Jan. 11, 1924
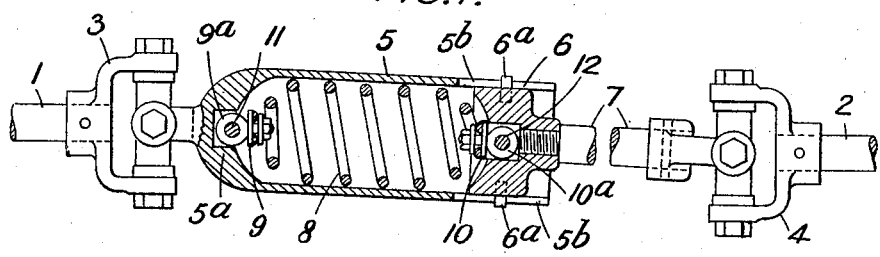
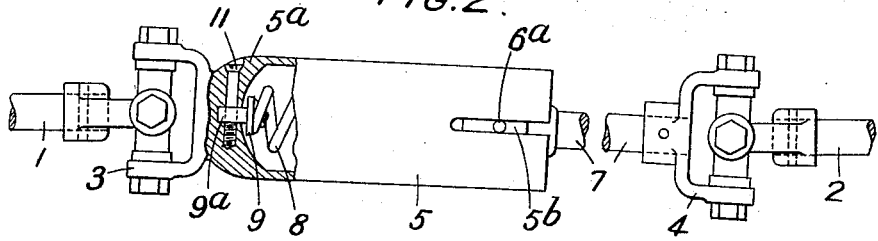
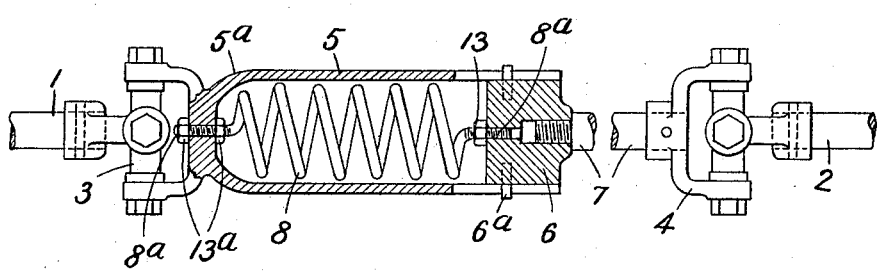
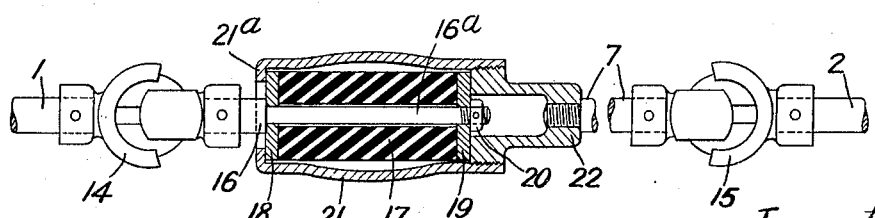
Inventor
Chris ter Cock
by Wilkinson & Giusta
Attorneys.

Patented Jan. 6, 1925.

1,522,417

UNITED STATES PATENT OFFICE.

CHRIS TER COCK, OF NAARDEN, NETHERLANDS.

SHAFT OR ROD COUPLING.

Application filed January 11, 1924. Serial No. 685,672.

*To all whom it may concern:*

Be it known that I, CHRIS TER COCK, a subject of the Queen of Holland, and residing at Naarden, Netherlands, have invented certain new and useful Improvements in or Relating to Shaft or Rod Couplings (for which I have filed an application in Great Britain, dated Dec. 7, 1922), of which the following is a specification.

This invention relates to means for coupling shafts or rods together in such a manner that the shaft or rod to be moved can be reciprocated in either direction, the coupling being provided with a spring whereby, should an obstacle be encountered, the coupling will be able to give way.

It has been proposed to solve the difficulties due to obstruction encountered by the operated member by the interposition of a resilient coupling between the operating and the operated axially aligned shafts or rods.

In order to effect speed changes in driving gears such as, for example, are used in motor vehicles, gear wheels or clutch members are shifted axially by means of striker rods each of which, by being arranged to be shifted in opposite directions, controls two gears. The striker rods are actuated by some kind of gear selecting device—for instance a gate change hand lever or semi-automatically operated device such, for example, as is described in the specification of my Patent No. 194628—comprising axially movable members or rods which are rigidly connected to the striker rods of the gear box. Such a rigid connection, however, is unsuitable, in several respects, for the smooth and correct functioning of the device. When the two gear wheels in meeting do not at once inter-engage not only a re-actionary shock but also a rattling noise is produced, while moreover, the selector device is prevented from completing its movement so that neither the gears nor the controlling member can be locked until meshing takes place.

If the gear selector device is mounted indpendently of the speed gear box it may happen that the connected rods of the two devices are not accurately in alignment so that their operation can only be effected under considerable pressure. This may be caused either by inaccurate assemblage or in the case of motor vehicles may occur at any moment through twisting of the chassis to which the latter is always more or less subjected on uneven and rough roads.

The present invention has for its object to provide between such operating and the operated members an elastic coupling which combines with its adaptability for taking up, by compression or by expansion of a resilient member thereof any difference in the relative distance of the axial movements of the two members due to obstructions or excessive resistance encountered by the operated member, the further adaptability to respond independently of the resilient member to any temporary or permanent deviations from axial alignment of the operating and the operated member.

Such an elastic coupling preferably consists in the interposition between the two shafts or rods axially movable by the push or pull action of either of the coupled members of a single resilient member such as a coiled spring or rubber buffer for example, which is attached to the said two members and adapted to yield by compression or expansion to any extraneous obstruction or resistance which may be encountered by the operated member (as for instance the non-meshing of the gear teeth in a speed gear mechanism) so that the operating member may nevertheless complete its stroke and its locking may be effected while the operated member, under pressure of the said resilient member, will complete its stroke as and when the teeth of the two gear wheels are in relative position enabling them to slide into engagement.

The resilient member is connected by means of Cardan or similar joints to the rod of the selecting device on the one hand and to the striker rod on the other hand, so that not only is the device enabled to adjust itself automatically to any divergencies from straight alignment of the said two members, but the arrangement in itself permits the selecting device and the gear box to be positioned in the most convenient place without any need for consideration of straight alignment.

In order to prevent the spring from being twisted by the action of the Cardan joints its connection therewith is effected in such a manner that such connections may perform rotary movements independently of the spring.

The accompanying drawings illustrate constructional examples embodying the invention.

Fig. 1 is a longitudinal section through a flexible coupling showing one form of my invention and, Fig. 2 is a view partly in section of the same at right angles to Fig. 1, Fig. 3 shows in longitudinal section a similar construction with a modified spring attachment, and Fig. 4 shows a construction in which the resilient member is formed by a rubber sleeve or buffer, In the drawings, the shifting rod 1 of the gear selecting device is connected to the striker rod 2 of the gear box, which is assumed to carry the striker fork and is to be operated in opposite axial directions. Each of the rods 1 and 2 is connected by means of a Cardan joint 3 and 4 (Figs. 1 and 3) or other universal joint to the interposed flexible coupling device.

In the examples shown in Figs. 1, 2 and 3 the flexible coupling comprises a tubular casing 5 one end of which is rigidly connected to or is integral with the Cardan joint 3, while a cylindrical head 6 slidably mounted in the other open end of the tubular member 5, and guided by pins 6ª in slots 5ᵇ in the casing 5 is connected by means of a rod 7 to the other Cardan joint 4. A coiled spring 8 is connected at one end to the tubular casing 5 and at its other end to the sliding head 6, in such a manner that it is enabled to rotate independently of the casing 5 and the head 6.

In Figs. 1 and 2 the ends of the spring 8 are secured to discs 9 and 10 carried concentrically to the tube 5 and rotatably on the shanks of eye bolts 9ª and 10ª which are pivotally secured in recesses in the head 5ª of the tube 5 and in the cylindrical block 6 respectively by means of pins or screws 11 and 12.

The guide pins 6ª and slots 5ᵇ hereinbefore mentioned have the function of preventing the tubular member 5 from rotating on the cylindrical head 6 and thereby prevent the spring 8 from being twisted. It is evident that the pins 6ª might be replaced by the head and a projecting opposite end of the screw 12, or by shaping the casing and head so that while the head can reciprocate in the casing it cannot rotate.

In the arrangement shown in Fig. 3 the ends 8ª of the spring 8 are bent out axially and screw threaded, one end being screwed directly into the block 6 and locked by a lock nut 13, while its other end is rotatably bearing in a central bore in the head 5ª of the tubular member 5 and retained by the two lock nuts 13ª.

The working of either of these arrangements is as follows:—

When the rod 1 is pushed towards the right its motion is transmitted to the rod 2 through the Cardan joint 3, spring 8 (which is of sufficient strength to prevent it from being appreciably compressed) block 6, rod 7 and Cardan joint 4. Should an obstacle tend to prevent the rod 2 from moving, there will be no breakage or jamming of the parts since the continued pressure on the rod 1 will merely compress the spring 8, so that when the obstacle is removed the spring 8 acting on the block 6 will cause the rod 2 to complete its stroke.

When the rod 1 is pulled to the left the spring 8 will pull the block 6 with its appendages (viz rod 7, Cardan joint 4 and rod 2) but should the rod 2 be arrested by an obstacle such as clashing of the gears to be engaged while the pull of the rod 1 on the spring 8 continues the latter will expand until the obstacle is removed when the spring 8 will draw the block 6 and its attached parts towards the left.

Analagous performances takes place when the rod 2 is the operating and rod 1 the operated member.

Instead of employing a coiled spring, I may insert another form of resilient device, such as a cylindrical block of rubber or a series of rubber rings with or without interposed metal washers may be arranged. In such case it may be necessary to so shape the casing as to allow for lateral expansion of the rubber when compressed.

Such a device is shown in Fig. 4 where the rod 16 of the coupling connected to the universal joint 14 carries on its reduced extension 16ª a rubber buffer 17 which may be formed as a stout rubber sleeve or be composed of a plurality of rubber rings, held between a washer 18 resting against the shoulder of the rod 16 and a washer 19 retained by a nut or collar 20 on the rod extension 16ª. The washers 18 and 19 are adapted to slide in the tubular casing 21 which at one end is provided with an inward flange 21ª gripping over the washer 18 and at its other end is connected to the striker rod 2 by means of a screw plug 22, rod 7 and universal joint 15. In order to allow for the bulging of the rubber buffer under compression the casing 21ª is barrel shaped as shown in the drawing.

In operation the rubber buffer 17 always acts under compression. When the rod 1 is pushed to the right, the movement is imparted to the striker rod 2, through the rod 16, washer 18, rubber buffer 17, washer 19, plug 22—which carries with it the casing 21—rod 7 and universal joint 15. Should the rod 2 meet with an obstacle, the rod 1 in completing its stroke will compress the rubber buffer 17 against the washer 19 which will not move owing to the obstacle until the latter is removed whereupon the washer 19, plug and casing and attached parts will move to the right.

When the rod 1 is pulled to the left it operates directly through the rod 16, 16ª and nut 20 on the washer 19 and thereby on the buffer 17, washer 18 and on the flange 21ª of the casing 21. If the movement of the rod 2 is prevented by an obstruction, the washer 18 will be held back by the flange 21ª and washer 19 in completing the stroke with the rod 1 will compress the buffer 17 until the obstacle disappears whereupon the spring 17 acting on the washer 18 will cause the rod 2 to move to the left.

What I claim and desire to protect by Letters Patent is:—

An elastic coupling for shafts to be moved axially by a push or pull action of either of the coupled members, comprising a cylindrical casing annularly bulged intermediate its ends, a movable washer in each end of the casing and of substantially the same diameter as the casing, a resilient cylindrical block of substantially the same diameter as the casing interposed between the washers, one of the shafts extending into the casing and through the washers and resilient block, an abutment on the end of said shaft extension bearing against the outer face of one washer, a second abutment on said shaft extension spaced from the first abutment and bearing against the outer face of the other washer, and stops at opposite ends of the casing to engage said washers when said shaft extension is moved in opposite directions, said cylindrical block adapted to be compressed between the washers and said bulged portion of the casing being adapted to receive the compressed and expanded portion of the block.

In testimony whereof I affix my signature in presence of two witnesses.

CHRIS TER COCK.

Witnesses:
 H. G. KUEFFESS,
 M. HENNING.